Figure 1:
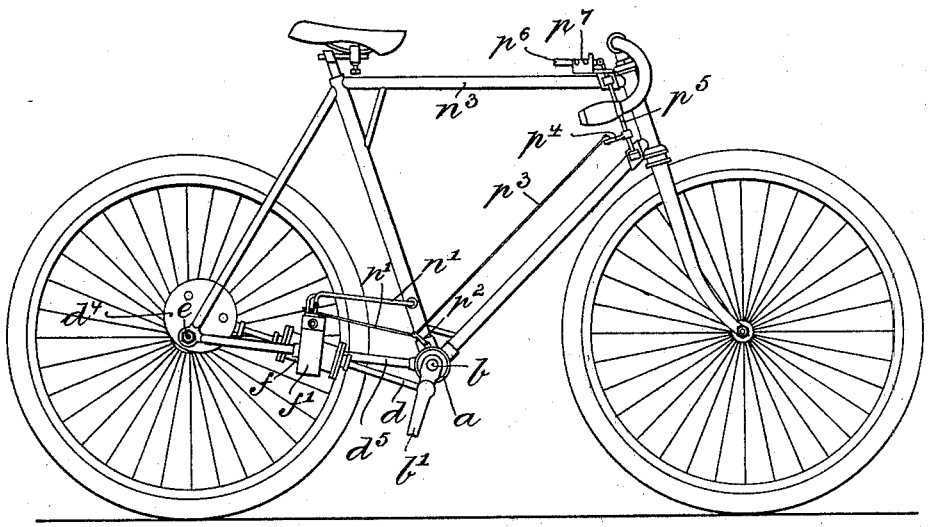

No. 610,956. Patented Sept. 20, 1898.
Z. T. UBIL.
PROPELLING MECHANISM FOR BICYCLES OR SIMILAR VEHICLES.
(Application filed Feb. 25, 1898.)

(No Model.) 3 Sheets—Sheet 1.

Witnesses:
Thomas M. Smith.
Richard E. Maxwell.

Inventor:
Zachariah T. Ubil,
By J. Walter Douglass,
Attorney.

No. 610,956. Patented Sept. 20, 1898.
Z. T. UBIL.
PROPELLING MECHANISM FOR BICYCLES OR SIMILAR VEHICLES.
(Application filed Feb. 25, 1898.)
(No Model.) 3 Sheets—Sheet 2.

Witnesses:
Thomas M. Smith
Richard C. Maxwell

Inventor:
Zachariah T. Ubil,
By J. Walter Douglass
Attorney.

No. 610,956. Patented Sept. 20, 1898.
Z. T. UBIL.
PROPELLING MECHANISM FOR BICYCLES OR SIMILAR VEHICLES.
(Application filed Feb. 25, 1898.)
(No Model.) 3 Sheets—Sheet 3.
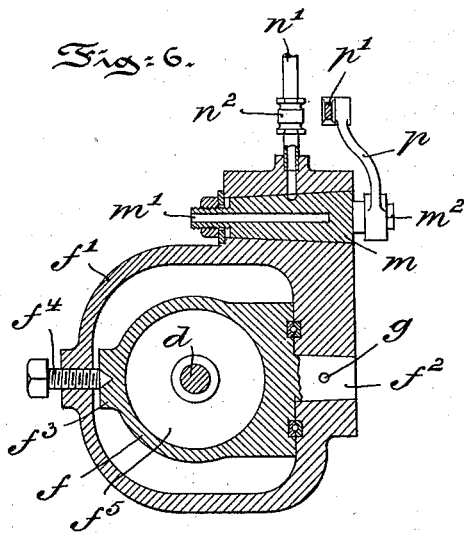
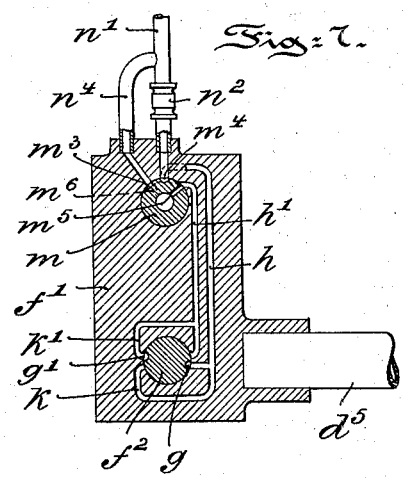
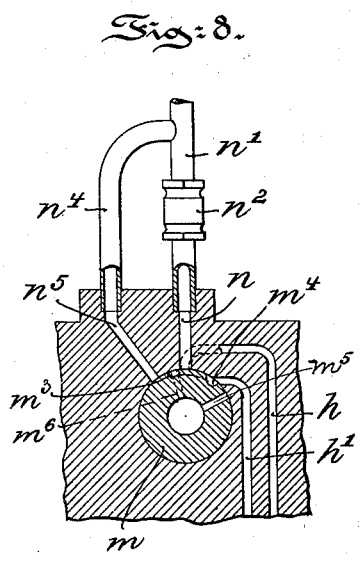
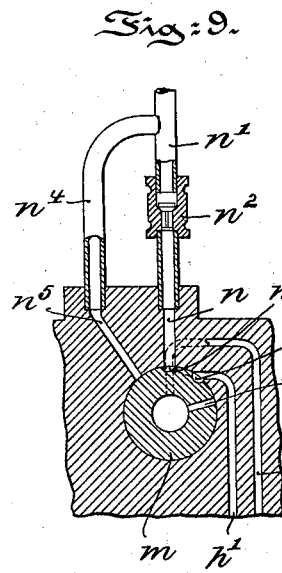
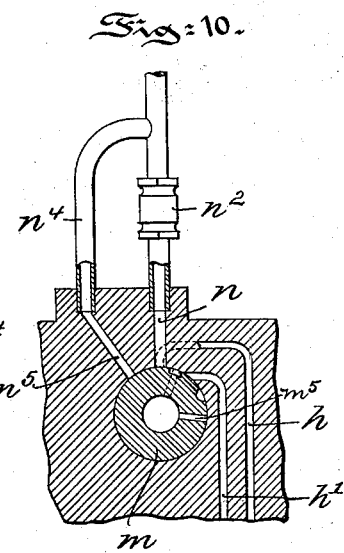
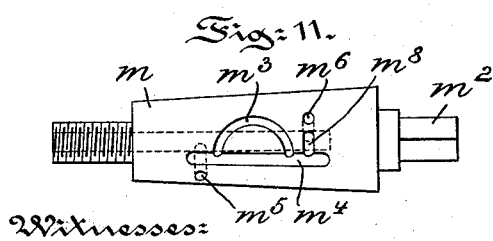
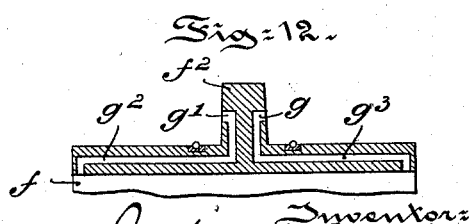
Witnesses:
Thomas M. Smith.
Richard C. Maxwell.
Inventor:
Zachariah T. Ubil,
By J. Walter Douglass
Attorney.

UNITED STATES PATENT OFFICE.

ZACHARIAH T. UBIL, OF OGONTZ, PENNSYLVANIA.

PROPELLING MECHANISM FOR BICYCLES OR SIMILAR VEHICLES.

SPECIFICATION forming part of Letters Patent No. 610,956, dated September 20, 1898.

Application filed February 25, 1898. Serial No. 671,546. (No model.)

*To all whom it may concern:*

Be it known that I, ZACHARIAH T. UBIL, a citizen of the United States, residing at Ogontz, in the county of Montgomery and State of Pennsylvania, have invented certain new and useful Improvements in Propelling Mechanism for Bicycles and Similar Vehicles, of which the following is a specification.

My invention has relation to a propelling mechanism for bicycles and similar vehicles which at the will of the rider may also be used to compress air for the purpose of utilizing the same as a motor or as a brake for the vehicle; and in such connection it relates particularly to the construction and arrangement of such a mechanism.

The principal objects of my invention are, first, to provide a simple and efficient mechanism for propelling the bicycle, which mechanism avoids the use of a chain; second, to provide in connection with such a mechanism means whereby during the operation of the mechanism air may be compressed and stored in the frame or suitable reservoir connected with the bicycle, and, third, to provide in connection with the propelling mechanism and air-compressing mechanism means whereby the compressed air may be used at will either as a motor-power for the vehicle or as a brake.

My invention consists, first, in a propelling mechanism comprising a crank-shaft operated by the treadles or pedals of the vehicle, a connecting-rod pivotally connected at one end to the crank-arm of said shaft, an internally-toothed ring carried by the other end of said connecting-rod, a driving-shaft to which the driving-wheel of the vehicle is connected, and a pinion secured to said driving-shaft and meshing with the internally-toothed ring; second, the combination, with the propelling mechanism, of an air-compressing mechanism comprising a cylinder adapted to oscillate in the frame of the bicycle and traversed by the connecting-rod of the propelling mechanism, said connecting-rod carrying a piston traversing said cylinder during the operation of the propelling mechanism, and said cylinder being connected to the frame or a reservoir by inlet-pipes, whereby the air compressed in said cylinder may be stored in said frame or reservoir, and, third, it consists in the combination, with the propelling mechanism and air-compressing mechanism, of a valve and operating means whereby the air compressed in said cylinder of the air-compressing mechanism may be utilized at the will of the rider either as a motor-power to operate the propelling mechanism or as a brake to retard the operation of said propelling mechanism.

My invention further consists of a propelling mechanism for bicycles constructed and arranged in substantially the manner hereinafter described and claimed.

The nature and scope of my invention will be more fully understood from the following description, taken in connection with the accompanying drawings, forming part hereof, in which—

Figure 4:
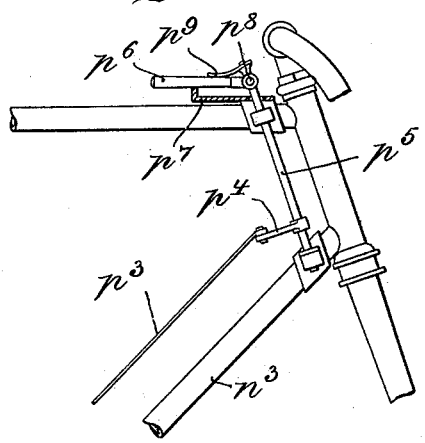
Figure 5:
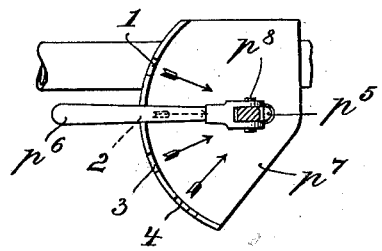
Figure 2:
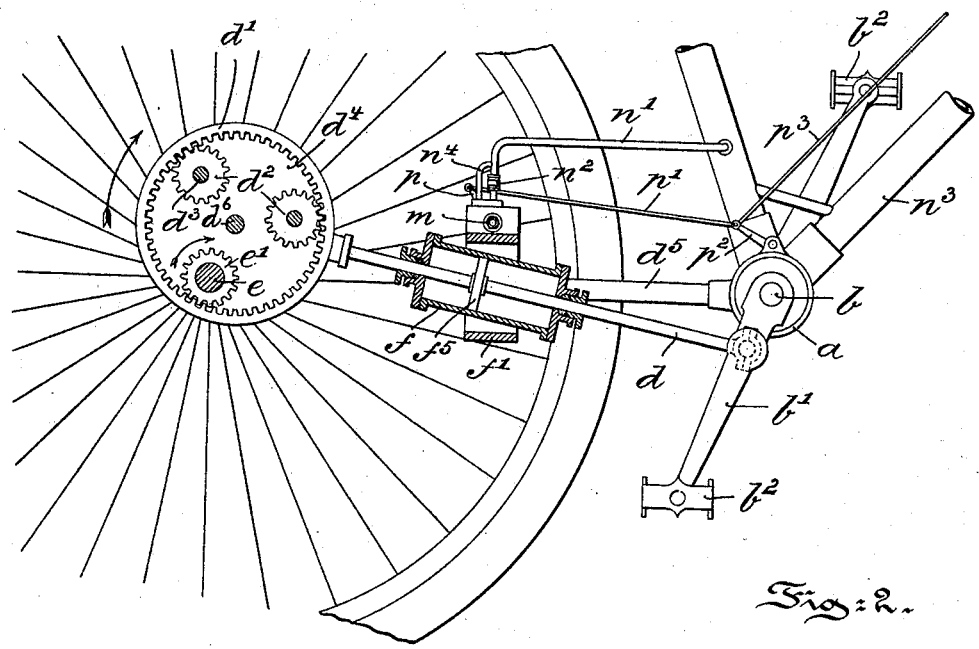
Figure 3:
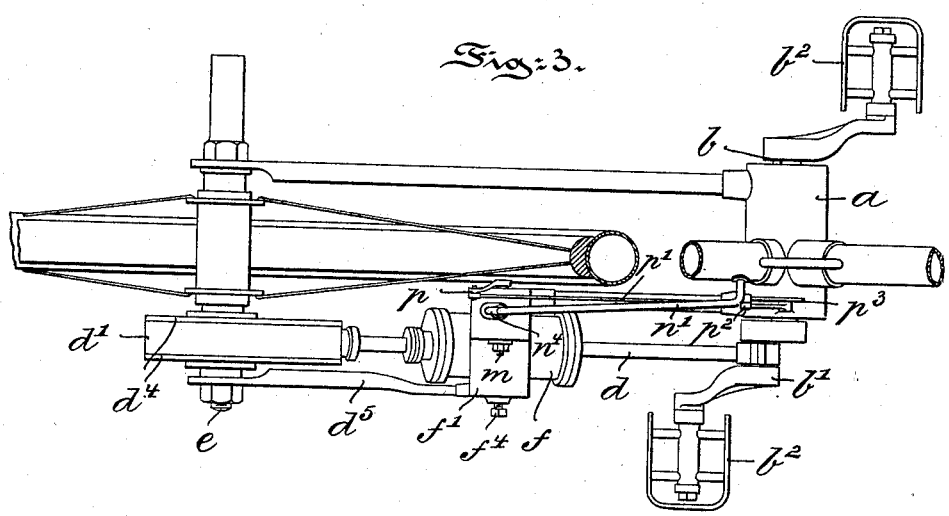

Figure 1 is a side elevational view of a bicycle the propelling mechanism whereof embodies the main features of my invention. Fig. 2 is an enlarged side view, partly in section, showing the propelling mechanism in detail. Fig. 3 is a horizontal sectional view of Fig. 2. Fig. 4 is an enlarged side elevational view of the mechanism for operating the valve of the air-compressing cylinder. Fig. 5 is a top or plan view, partly sectioned, of the operating-handle for the mechanism shown in Fig. 4. Fig. 6 is a cross-sectional view, enlarged, of the air-compressing cylinder and of the frame or bracket in which it swings or oscillates, and also of the plug-valve controlling the various inlet and outlet ports of said cylinder. Figs. 7, 8, 9, and 10 are sections taken at right angles to the section of Fig. 6 and illustrating various positions assumed by the plug-valve controlling the cylinder, Fig. 7 also showing the oscillating valve controlling the inlet and outlet ports of the cylinder. Fig. 11 is a side elevational view, enlarged, of the plug-valve; and Fig. 12 is a horizontal sectional view, enlarged, of the trunnion and a portion of the cylinder, showing the inlet and outlet ports of said cylinder.

Referring to the drawings, $a$ represents the crank-hanger, in which rotates the crank-shaft $b$, having a crank-arm $b'$ and operated by the treadles or pedals $b^2$. To the crank-arm $b'$ is pivotally connected one end of a connecting-rod $d$, the other end of which is secured to or carries an internally-toothed ring $d'$. On the rear axle $e$ of the bicycle is secured a pinion $e'$, meshing with the internally-toothed ring $d'$. The ring $d'$ is supported upon two idle-pinions $d^2 d^2$, rotating on suitable studs $d^3$, carried by a plate or plates $d^4$, rotating eccentrically about the shaft or axle $e$ and between which the ring is inclosed, the ring $d'$ having an independent movement from the plates, as shown in Fig. 3. The plates $d^4$ are preferably united by a pin or stud $d^6$. The connecting-rod $d$ traverses a cylinder $f$, which oscillates in a frame or bracket $f'$, substantially as shown in Figs. 2, 3, and 6—that is to say, one of the back forks $d^5$ of the vehicle is formed into two pieces and united by a block or bracket $f'$, which encircles the cylinder $f$. The cylinder $f$ has a trunnion $f^2$, oscillating in the block $f'$, as shown in Figs. 6 and 7, and a trunnion $f^3$, oscillating upon a set-screw $f^4$, adapted to be advanced in the block $f'$ to adjust the cylinder $f$, so that it may oscillate freely in the block. The connecting-rod $d$ has on that portion which traverses the cylinder $f$ a head $f^5$, forming the piston for the cylinder $f$.

In the trunnion $f^2$ of the cylinder are formed two openings $g$ and $g'$, communicating, respectively, by channels $g^2$ and $g^3$ with the ends of the cylinder on either side of the piston $f^5$. As the cylinder oscillates in the block $f'$, the opening $g$ is caused to communicate with one of two channels $h$ and $h'$, and the other opening $g'$ is caused to communicate with one of two channels $k$ and $k'$, formed in the block $f'$—that is to say, as illustrated in Fig. 7, when the opening $g$ communicates with the channel $h$ the opening $g'$ communicates with the channel $k'$ and when the opening $g$ communicates with the channel $h'$ the opening $g'$ communicates with the channel $k$. The channels $h$ and $k$ communicate with each other by a branch, and the channels $h'$ and $k'$ likewise communicate with each other by a similar branch.

Within the block $f'$ and at the terminal points of channels $h$ and $h'$ is placed a plug-valve $m$, the interior of which is hollow and opens, as at $m'$, to the external air, whereas the other end is squared, as at $m^2$, for the reception of an operating-key $p$. As shown in detail at Fig. 11, the periphery of this plug-valve $m$ is provided with an arc-shaped groove $m^3$ and a longitudinal groove $m^4$, communicating with both ends of the arc-shaped groove $m^3$. The plug-valve $m$ is also provided with two openings $m^5$ and $m^6$, extending from the interior of the plug to the periphery of the plug. The opening $m^5$ forms what will hereinafter be termed an "exhaust" port and is indicated by full lines in Figs. 7, 8, 9, and 10, whereas the opening $m^6$ forms the "compressor" port and is indicated by dotted lines in the said figures. The block $f'$ is also provided with a perpendicular channel $n$, terminating above the plug-valve $m$ and at a point intermediate of the ends of the arc-shaped and longitudinal grooves $m^3$ and $m^4$. This channel $n$ communicates with a pipe $n'$, having a check-valve $n^2$ and leading to the frame $n^3$ of the bicycle, which frame is made air-tight. The pipe $n'$ may, if desired, lead to a separate reservoir (not shown) instead of to the frame $n^3$. From the pipe $n'$, above the check-valve $n^2$, leads a branch pipe $n^4$, which terminates in a channel $n^5$, extending through the block $f$ to the periphery of the plug-valve $m$ to the left of the channel $n$. The handle or key $p$ for the plug-valve $m$ is connected, by link $p'$, lever $p^2$, pivoted at one end to the crank-hanger $a$, link $p^3$, and arm $p^4$, to a rock-shaft $p^5$, operated by a handle $p^6$, as illustrated in Figs. 1, 2, 4, and 5. The handle $p^6$ is made to occupy one of four determined positions in the turning of the shaft $p^5$ for the reasons hereinafter described, and this is accomplished by placing beneath the handle $p^6$ a sector-plate $p^7$, the periphery of which has the notches 1, 2, 3, and 4. The handle $p^6$ is pivotally connected, as at $p^8$, to the shaft $p^5$, so that it can be elevated or lowered irrespective of the shaft $p^5$, and a spring $p^9$ serves normally to depress the handle down upon the sector-plate $p^7$ or into one of the recesses or notches 1 2 3 4 thereof.

In operation the rotation of the crank-shaft $b$ through the connecting-rod $d$ and ring $d'$ will drive the pinion $e'$ of the driving-axle $e$. In the movement back and forth of the connecting-rod $d$ the piston $f^5$ will traverse the cylinder $f$ and will compress the air at both ends thereof. To utilize this compressed air, the rider may at his pleasure through the handle $p^6$ operate the plug-valve $m$ to one of four positions. When the valve $m$ occupies the position shown in Fig. 9, the air from the cylinder $f$ is forced into the frame $n^3$ after it is compressed. In this position of the valve $m$ the channels $h$ and $h'$, leading from opposite ends of the cylinder through the trunnion-openings $g$ and $g'$, communicate, respectively, with the compressor-port $m^6$ and the longitudinal groove $m^4$. That is to say, the channel $h$ leads to the exhaust-port and serves to draw air into the cylinder back of the piston, while the channel $h'$ leads to the groove $m^4$ and forces air through said groove and the arc-shaped groove $m^3$ to the channel $n$, leading to the pipe $n'$, the groove $m^3$ in this position of the valve $m$ being directly under the channel $n$. Having thus pumped sufficient air through pipe $n'$ to the frame $n^3$, the check-valve $n^2$ preventing the escape of said air, the rider, if he desires, may utilize this compressed air as a motor to operate the piston $f^5$ by turning the valve $m$ to the position shown in Fig. 7. In this position the channel $h'$ leads direct to the exhaust-port $m^5$, whereas the channel $h$ leads to the longitudinal groove $m^4$. The lower end of pipe $n'$, which leads to channel $n$, is closed by the check-valve $n^2$; but the channel $n^5$ of branch pipe $n^4$ is in open communication with the arc-shaped groove $m^3$, and hence with the groove $m^4$ and the channel $h$. Air from the frame $n^3$ is thus forced through branch pipe $n^4$ down channel $h$ and by the movement of the trunnion $f^2$ is alternately forced through ports $g$ and $g'$ to opposite ends of cylinder $f$ to operate the piston $f^5$.

In Fig. 10 a position is illustrated wherein the air in the cylinder $f$ is prevented from escaping from the cylinder and acts as a cushion on either side of the piston $f^5$. In this instance channels $h$ and $h'$ are closed by valve $m$ and the channels $n$ and $n^5$ are likewise closed.

In Fig. 8, which represents a normal position in which the cylinder is inactive, the channel $h'$ communicates with groove $m^4$, which through a small branch $m^8$ is also brought into communication with channel $h$. A constant circulation of air is thereby produced through channels $h$ $h'$ and the cylinder $f$. In this position pipes $n'$ and $n^4$ are both closed.

Having thus described the nature and objects of my invention, what I claim as new, and desire to secure by Letters Patent, is—

1. In a bicycle, a propelling mechanism comprising a crank-shaft, crank-arm, pedals for operating said crank-shaft, a connecting-rod pivotally connected at one end to the crank-arm, an internally-toothed ring carried by the connecting-rod and adapted to drive the rear axle of the vehicle, a cylinder mounted to oscillate in the frame of the vehicle, and traversed by the connecting-rod, a piston formed on said connecting-rod, and ports leading from the cylinder to the frame of the bicycle or other reservoir for storage of air compressed in said cylinder, substantially as and for the purposes described.

2. In a bicycle, in combination with the propelling mechanism consisting of the crank-shaft, connecting-rod, internally-toothed ring and driven shaft, of an oscillating cylinder traversed by said rod, a head or piston carried by said connecting-rod and adapted to traverse the cylinder during the operation of the propelling mechanism, ports leading from the cylinder to the frame or other reservoir to convey the compressed air from the cylinder, a valve controlling said ports and mechanism for operating said valve whereby the compressed air in said frame or reservoir may be utilized at will either as a motive power to operate the propelling mechanism or as a brake for said propelling mechanism, substantially as and for the purposes described.

In testimony whereof I have hereunto set my signature in the presence of two subscribing witnesses.

ZACHARIAH T. UBIL.

Witnesses:
   THOMAS M. SMITH,
   RICHARD C. MAXWELL.